United States Patent
Liu

(10) Patent No.: US 10,832,033 B2
(45) Date of Patent: Nov. 10, 2020

(54) MEASUREMENT GAUGE DATA STORAGE METHOD AND APPARATUS

(71) Applicant: SHENZHEN PRTEK CO. LTD., Guangdong (CN)

(72) Inventor: Guohua Liu, Guangdong (CN)

(73) Assignee: SHENZHEN PRTEK CO., LTD., Shenzhen (CN)

( * ) Notice: Subject to any disclaimer, the term of this patent is extended or adjusted under 35 U.S.C. 154(b) by 76 days.

(21) Appl. No.: 16/310,068

(22) PCT Filed: Apr. 26, 2017

(86) PCT No.: PCT/CN2017/081943
§ 371 (c)(1),
(2) Date: Dec. 14, 2018

(87) PCT Pub. No.: WO2017/215354
PCT Pub. Date: Dec. 21, 2017

(65) Prior Publication Data
US 2019/0318155 A1 Oct. 17, 2019

(30) Foreign Application Priority Data
Jun. 14, 2016 (CN) .......................... 2016 1 0416459

(51) Int. Cl.
*G06K 9/00* (2006.01)
*G06F 16/9035* (2019.01)

(52) U.S. Cl.
CPC ..... *G06K 9/00268* (2013.01); *G06F 16/9035* (2019.01); *G06K 9/00248* (2013.01);
(Continued)

(58) Field of Classification Search
CPC ........... G06K 9/00268; G06K 9/00288; G06K 9/00248; G06K 9/00335; G06K 9/00255; G06F 16/9035
See application file for complete search history.

(56) References Cited

U.S. PATENT DOCUMENTS

| | | | | |
|---|---|---|---|---|
| 6,766,583 B2 * | 7/2004 | Economaki | ............ | G01B 3/205 33/534 |
| 6,988,018 B2 * | 1/2006 | Eames | .................... | D21F 1/483 162/351 |
| 7,628,787 B2 * | 12/2009 | Sartor | .................. | A61B 18/042 606/41 |
| 9,188,672 B2 * | 11/2015 | Vandervalk | ............. | G01S 15/88 |

(Continued)

FOREIGN PATENT DOCUMENTS

| CN | 102903068 A | 1/2013 |
|---|---|---|
| CN | 103078783 A | 5/2013 |

(Continued)

OTHER PUBLICATIONS

International Search Report and Written Opinion and English translation thereof dated ed Jul. 21, 2017, in connection with International Application No. PCT/CN2017/081943, 14 pages.

(Continued)

*Primary Examiner* — Amir Alavi
(74) *Attorney, Agent, or Firm* — Rimon PC

(57) ABSTRACT

The present invention relates to a measurement gauge data storage method and apparatus. The method comprises: establishing a connection with a measurement gauge; identifying user characteristics in order to determine a corresponding user ID, and acquiring measurement results outputted by the measurement gauge; detecting whether a user record table corresponding to the user ID is stored; and, when a user record table corresponding to the user ID is stored, storing the measurement results in the user record table corresponding to the user ID. The present method determines a user ID corresponding to user characteristics in order to determine a corresponding user record table, and can thus accurately file measurement results in a corresponding user record table; results are reliable, the system structure is simple, the method is simple to operate, and the scope of application is wide.

20 Claims, 8 Drawing Sheets

(52) U.S. Cl.
CPC ..... *G06K 9/00255* (2013.01); *G06K 9/00288* (2013.01); *G06K 9/00335* (2013.01)

(56) References Cited

U.S. PATENT DOCUMENTS

| | | | | |
|---|---|---|---|---|
| 10,092,223 | B2* | 10/2018 | Inagaki | .................. H04R 25/30 |
| 10,332,367 | B1* | 6/2019 | Benkreira | ................ G06F 21/34 |
| 10,395,128 | B2* | 8/2019 | Van Os | .............. G06K 9/00255 |
| 2014/0333524 | A1 | 11/2014 | Liu et al. | |
| 2019/0318155 | A1* | 10/2019 | Liu | ..................... G06F 16/9035 |

FOREIGN PATENT DOCUMENTS

| | | |
|---|---|---|
| CN | 103198541 A | 7/2013 |
| CN | 103442081 A | 12/2013 |
| CN | 104049721 A | 9/2014 |
| CN | 204192587 U | 3/2015 |
| CN | 106095340 A | 11/2016 |
| WO | 2017/215354 A1 | 12/2017 |

OTHER PUBLICATIONS

International Preliminary Report on Patentability and English translation thereof dated Dec. 27, 2018 in connection with International Application No. PCT/CN2017/081943, 12 pages.

Chinese First Office Action for Chinese Application Serial No. 201610416459.9 dated Aug. 15, 2018, 25 pages. (Including English Translation).

* cited by examiner

US 10,832,033 B2

MEASUREMENT GAUGE DATA STORAGE METHOD AND APPARATUS

PRIORITY CLAIMS

The present application is a US national phase application of and claims priority to PCT application PCT/CN2017/081943 filed on Apr. 26, 2017 and titled Measurement Gauge Data Storage Method and Apparatus, which claims priority to Chinese Patent Application No. 201610416459.9 filed on Jun. 14, 2016, and titled Manufacturing Methods of Data Storage Methods and Devices for Measuring Instruments, the contents of both being expressly incorporated herein in its entirety.

TECHNICAL FIELD

The present disclosure relates to data storage technologies, and in particular, to a measurement gauge data storage method and a measuring gauge data storage apparatus.

BACKGROUND

With the progress of society and the gradual improvement of people's living standards, the awareness of public health and disease prevention is continuously enhanced, and regular physical examination has become an important part of health care. A conventional physical examination generally needs to be carried out in a hospital or a premise. Due to a large number of inspection items, scattered locations, unfamiliar business, and the like, a time cost for completing a physical examination is often not accepted by people. Therefore, a large number of family physical examination equipment is emerged.

Although many families have purchased various household physical examination equipment, such as weight scale, thermometer, blood pressure monitor, and Hygrothermograph for testing home environments, these equipments have following disadvantages: data cannot be saved, and each measurement result data can be merely used as a current reference.

Therefore, how to save measurement results of the aforementioned household physical examination equipment is a problem to be solved. Currently, the most common solution is to add a storage module for the afore-mentioned household physical examination equipment. However, firstly, the capacity of the storage module is limited, and secondly, even if the measurement data is stored in the storage module, it is impossible to determine which user the stored measurement data belongs to, therefore practical value thereof is not high. In addition, there is still a solution using an wearable bracelet, but when the bracelet is connected to a mobile phone, firstly, a corresponding APP thereof must be installed in the mobile phone; secondly, the user can merely view his/her own measurement data, when the same bracelet is used by multiple users, each user can merely views respective measurement data, which makes the household physical examination equipment inconvenient to use and makes it inconducive for the improvement of human-computer interaction.

SUMMARY

According to various embodiments of the present disclosure, a measurement gauge data storage method and a measuring gauge data storage apparatus are provided.

A method of storing data of a measuring gauge includes establishing a connection with the measuring gauge; identifying a user characteristic to determine a corresponding user identifier and acquiring a measurement result outputted by the measuring gauge; detecting whether there is a user record table corresponding to the user identifier; and when there is the user record table corresponding to the user identifier, storing the measurement result in the user record table corresponding to the user identifier.

In one of the embodiments, the step of identifying the user characteristic to determine the corresponding user identifier includes: collecting a face image; identifying a face in the face image; and when there is only one face existing in the face image, determining the corresponding user identifier according to the only one face existing in the face image.

In one of the embodiments, the step of identifying the user characteristic to determine the corresponding user identity further includes: when there are at least two faces in the face image, collecting a gesture image; identifying a gesture in the gesture image; identifying a face corresponding to the gesture; and determining a corresponding user identifier according to the face corresponding to the gesture.

In one of the embodiments, the step of identifying the user characteristic to determine the corresponding user identity further includes: when there is no face existing in the face image, acquiring an inputted user characteristic; and determining the corresponding user identifier according to the user characteristic.

In one of the embodiments, the step of acquiring the inputted user characteristic includes: inputting the user characteristic by voice prompting or text prompting; and identifying the inputted user characteristic inputted by the manner of voice or text.

In one of the embodiments, the step of identifying the user characteristic to determine the corresponding user identifier includes: collecting a face image in the viewing frame; identifying a face in the face image; and determining the corresponding user identifier according to the face.

In one of the embodiments, the step of identifying the user characteristic to determine the corresponding user identifier includes: collecting a gesture image; identifying a gesture in the gesture image; identifying a face corresponding to the gesture; and determining the corresponding user identifier according to the face corresponding to the gesture.

In one of the embodiments, the step of identifying the user characteristic to determine the corresponding user identifier includes: acquiring an inputted user characteristic; and determining the corresponding user identifier according to the inputted user characteristic.

In one of the embodiments, the step of acquiring the inputted user characteristic includes: acquiring the user characteristic inputted by a manner of voice; or acquiring the user characteristic inputted by a manner of handwriting; or acquiring the user characteristic inputted by a manner of gesture.

In one of the embodiments, the method further includes: when there is no user record table corresponding to the user identifier, registering a new user record table; and storing the measurement result stored in the registered new user record table.

In one of the embodiments, the step of identifying the user characteristic to determine the corresponding user identifier and acquiring the measurement result outputted by the measuring gauge includes: acquiring the measurement result outputted by the measuring gauge; determining, according to the measurement result, whether there is only one user record table in which a measurement result of the same category exists; when there is only one user record table in which the measurement result of the same category exists, comparing the measurement result with the measurement result of the same category existing in the user record table; when a difference between the measurement result and the measurement result of same category existing in the user record table is less than a threshold, determining the corresponding user identifier according to the user characteristic corresponding to the user record table.

An apparatus of storing data of a measuring gauge includes: a communication module configured to establish a connection with the measuring gauge and acquire a measurement result outputted by the measuring gauge; a user identifier identification module configured to identify a user characteristic to determine a corresponding user identifier; and a measurement result storage module configured to detect whether there is a user record table corresponding to the user identifier, and when there is a user record table corresponding to the user identifier, store the measurement result in the user record table corresponding to the user identifier.

In one of the embodiments, the user identifier module includes: an image collection unit configured to collect a face image; a face identification unit configured to identify a face in the face image, and determine the user identifier according to a only one face existing in the face image when there is the only one face existing in the face image.

In one of the embodiments, the image collection unit is further configured to collect a gesture image when there are at least two faces existing in the face image; the user identifier identification module further includes: a gesture identification unit configured to identify a gesture in the gesture image; wherein after identifying the face corresponding to the gesture, the face identification unit is further configured to determine the user identifier according to the face corresponding to the gesture.

In one of the embodiments, the user identifier identification module includes: an image collection unit configured to acquire a gesture image; a gesture identification unit configured to identify a gesture in the gesture image; and a face identification unit configured to identify a face corresponding to the gesture, and determine the corresponding user identifier according to the face corresponding to the gesture.

In one of the embodiments, the user identifier identification module further includes: an input unit configured to determine the corresponding user identifier according to the characteristic characteristic inputted user characteristic after acquiring the inputted user identifier when there is no user characteristic existing in the face image.

In one of the embodiments, the input unit includes: a prompting subunit configured to input a user characteristic by voice prompt or text prompt when there is no face existing in the face image; a voice identification subunit configured to identify a user characteristic inputted by a manner of voice, and determine the corresponding user identifier according to the inputted user characteristic; and/ or a text identification subunit configured to identify a user characteristic input by a manner of text, and determine the corresponding user identifier according to the characteristic characteristic inputted user characteristic.

In one of the embodiments, the user identifier module includes: an input unit configured to determine the corresponding user identifier according to an inputted user characteristic after acquiring the inputted user identifier.

In one of the embodiments, the input unit includes: a voice identification subunit configured to acquire a user characteristic inputted by the manner of voice, and determine the corresponding user identifier according to the inputted user characteristic; or a text identification subunit configured to acquire a user characteristic inputted by the manner of text, and determine the corresponding user identifier according to the inputted user characteristic; or a gesture identification subunit configured to acquire a user characteristic inputted by the manner of gesture, and determine the corresponding user identifier according to the inputted user characteristic.

In one of the embodiments, the user identifier module includes: a viewing frame unit configured to output a viewing frame; an image collection unit configured to collect a face image in the viewing frame; and a face identification unit configured to identify a face in the face image, and determine the corresponding user identifier according to the face.

In one of the embodiments, the measurement result storage module includes: a detection unit configured to detect whether there is a user record table corresponding to the user identifier; a registration unit configured to register a new user record table when there is no user record table corresponding to the user identifier; and an updating unit configured to store the measurement result in the user record table corresponding to the user identifier when there is the user record table corresponding to the user identifier, and store the measurement result in the registered new user record table after registering the new user record table.

In one of the embodiments, the user identifier identification module includes: a data analysis unit configured to determine the user identifier according to the user characteristic corresponding to the user record table, when there is only one user record table in which a measurement result of the same category exists and a difference between the measurement result and the measurement result of the same category existing in the user record table is less than a threshold.

The aforementioned method and apparatus of storing data of the measuring gauge store the measurement result outputted by the measuring gauge in a measuring gauge data storage apparatus, and determine the corresponding user identifier according to the user characteristic to determine the corresponding user record table, so that the measurement result can be accurately archived into the corresponding user record table, the result is reliable, the apparatus is simple, and the method is easy to operate, therefore the application scope thereof is wide.

DETAILED DESCRIPTION OF THE EMBODIMENTS

Figure 1:
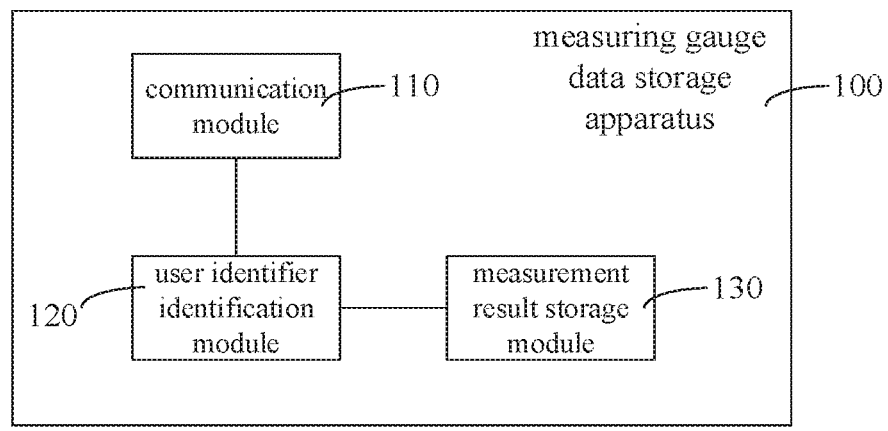
FIG. 1 is a block diagram of a measuring gauge data storage apparatus according to one of the embodiments.

To illustrate the objects, technical solutions, and advantages of the present application more clearly, the present application will be further described in detail below with reference to the accompanying drawings and embodiments. It should be understood that the specific embodiments described herein are merely illustrative of the application and are not intended to limit the invention.

Before describing in detail embodiments in accordance with the present application, it should be noted that the described embodiments are primarily combinations of steps and system components associated with the measuring gauge data storage method and apparatus. Accordingly, the system components and the steps of the method have been shown in the drawings by conventional symbols in appropriate positions, which are merely details related to the understanding of the embodiments of the present application, therefore avoiding those details apparent to those of ordinary skill in the art from obscuring the disclosure of the present application.

In this context, relational terms such as left and right, up and down, front and rear, first and second, and the like are merely used to distinguish one entity or action from another entity or action, without necessarily requiring or implying any actual relationship or order between entities or actions. The term "comprising," "comprises," "including", "includes", or other variants are intended to cover non-exclusive inclusions, thus a process, method, article, or device, that includes a series of elements, not only includes those elements explicitly listed but also other elements that are not explicitly listed, or elements that are inherent to such a process, method, article, or device.

Referring to FIG. 1, it illustrates a block diagram of a measuring gauge data storage apparatus 100 according to one of the embodiments. In this embodiment, the measuring gauge data storage apparatus 100 includes a communication module 110, a user identifier identification module 120, and a measurement result storage module 130. In this embodiment, the communication module 110 acquires a measurement result outputted by a measuring gauge in real time, the user identifier recognition module 120 determines a corresponding user identifier according to a user characteristic, and the measurement result storage module determines a corresponding user record table according to the determined user identifier, so that the measurement result can be accurately archived into respective user record table, which avoids the measurement result of a user A to be stored in the user record table of a user B, therefore the reliability thereof is high. When the user needs to view the measurement result, it can be conveniently viewed, therefore the application scope of the apparatus is wide.

Figure 2:
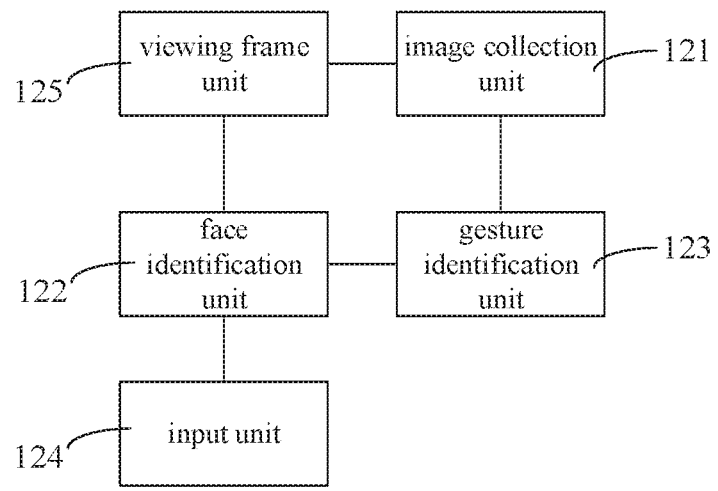
FIG. 2 is a block diagram of a user identifier identification module according to one of the embodiment.

In one of the embodiments, referring to FIG. 2, it illustrates a block diagram of the user identifier identification module. In this embodiment, the user identifier identification module 120 includes an image collection unit 121 and a face identification unit 122. The image collection unit 121 is used to collect a face image. The face identification unit 122 can identify a face in the collected face image. When there is only one face existing in the collected face image, the user identifier can be determined according to the only one face existing in the face image. In this way, different users can be distinguished by the user characteristics of their own, so that the measurement result can be more accurately stored in the corresponding user record table, and the reliability thereof is high.

In one of the embodiments, referring to FIG. 2 continuously, in this embodiment, the user identifier identification module 120 includes an image collection unit 121, a face identification unit 122, and a gesture identification unit 123. The image collection unit 121 is used to collect a face image and a gesture image. In this embodiment, the face identification unit 122 identifies the face firstly, and when there are at least two faces in the face image, the gesture identification unit 123 determines the unique measured user, that is, the gesture identification unit 123 identifies the gesture in the gesture image, and at last the face identification unit 122 determines the user identifier of the unique measured user.

In one of the embodiments, referring to FIG. 2 continuously, in this embodiment, the user identifier identification module 120 includes an image collection unit 121, a face identification unit 122, and a gesture recognition unit 123. The image collection unit 121 is used to collect a face image and a gesture image. In the present embodiment, when the face image and the gesture image appear simultaneously within a visible range of the image collection unit 121, the image collection unit 121 preferentially acquires the gesture image. The gesture recognition unit 123 is used to identify a gesture in the gesture image, and the face identification unit 122 is used to identify a face corresponding to the gesture and determine the corresponding user identifier according to the face corresponding to the gesture.

In one of the embodiments, referring to FIG. 2 continuously, in this embodiment, the user identifier identification module 120 includes an image collection unit 121, a face identification unit 122, and an input unit 124. In the present embodiment, the image collection unit 121 is used to collect a face image. The face identification unit 122 is used to identify a face in the face image. When there is no face in the face image, the input unit 124 acquires an inputted user characteristic and determines the corresponding user identifier according to the inputted user characteristic. In one embodiment, the input unit 124 can include a prompting subunit and a voice identification subunit. The prompting subunit is used to voice prompt or text prompt to input a user characteristic when there is no face existing in the face image, and the voice identification subunit identifies the user characteristic inputted by the manner of voice by the user and determines the corresponding user identifier accor user characteristic. In alternative embodiment, the input unit 124 can include a prompting subunit and a text identification subunit. The prompting subunit is used to voice prompt or text prompt to input a user characteristic when there is no face existing in the face image. The text identification subunit identifies the user characteristic inputted by the manner of text by the user and determines the corresponding user identifier according to the inputted user characteristic.

In one of the embodiments, referring to FIG. 2 continuously, the user identifier identification module 120 includes an image collection unit 121, a viewing frame unit 125, and face identification unit 122. The image collection unit 125 is used to collect a face image. The viewing frame unit 125 is used to ensure that there is only one face existing in the collected face image. The face identification unit 122 is used to identify a face in the face image and determine the corresponding user identifier according to the face.

Figure 3:
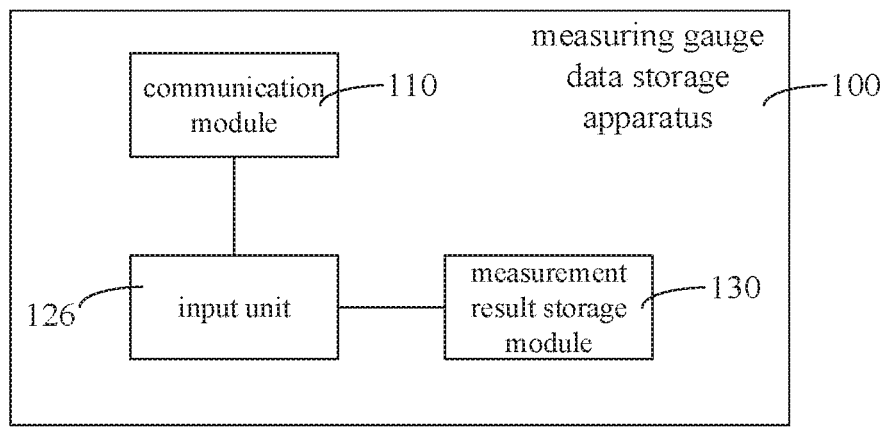
FIG. 3 is a schematic diagram illustrating a measuring gauge data storage apparatus according to one the the embodiments.

In one of the embodiments, referring to FIG. 3, it is a block diagram of a measuring gauge data storage apparatus. In this embodiment, the user identifier identification module 120 includes an input unit 126 for acquiring an inputted user characteristic, and determining a corresponding user identifier according to the inputted user characteristic. User identifier. In one embodiment, the input unit 124 can include at least one of a voice identification subunit, a text identification subunit, and a gesture identification subunit. The voice identification subunit can acquire a user characteristic inputted by the manner of voice by the user, and determine a corresponding user identifier according to the inputted user characteristic; the text identification subunit can acquire a user characteristic inputted by the manner of text by the user, and determine a corresponding user identifier according to the inputted user characteristic; the gesture identification subunit can acquire the user characteristic inputted by the manner of gesture by the user, and determine a corresponding user identifier according to the inputted user characteristic.

Figure 4:
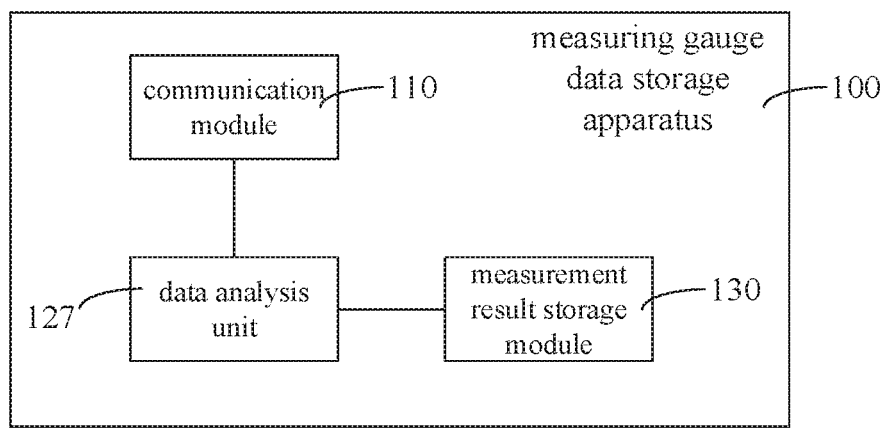
FIG. 4 is a schematic diagram illustrating a measuring gauge data storage apparatus according to one the the embodiments.

In one of the embodiments, referring to FIG. 4, it is a block diagram of a measuring gauge data storage apparatus. In this embodiment, the user identifier identification module 120 is a data analysis unit 127. The data analysis unit 127 determine the user characteristic corresponding to the user record table as the user identifier when there is only one user record table in which a measurement result of the same category exists, and a difference between the measurement result and the measurement result of the same category existing in the user record table is less than a threshold. The threshold described herein can be set respectively according to different categories of measurement results. For example, when the category of the measurement result is weight, the threshold can be set to be 1 kg; when the category of the measurement result is body temperature, the threshold can be set to be 0.5 Celsius; and when the measuring gauge is other apparatus, other thresholds can be preset, and there is no specific restrictions imposed here.

Figure 5:
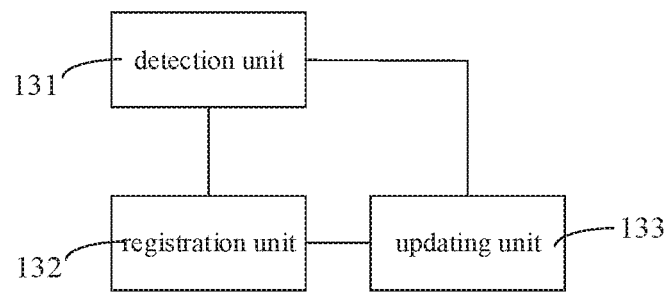
FIG. 5 is a schematic diagram illustrating a measurement result storage module according to one of the embodiments.

In one embodiment, referring to FIG. 5, it is a block diagram of the measurement result storage module. The measurement result storage module 130 includes a detection unit 131, a registration unit 132, and an updating unit 133. The detection unit 131 is used to detect whether there is a user record table corresponding to the user identifier determined by the user identifier identification module 120. The registration unit 132 is used to register a new user record table when there is no user record table corresponding to the user identifier determined by the user identifier identification module 120. The updating unit 133 is used to store the measurement result in the registered new user record table after registering the new user record table, and store the measurement result in the user record table corresponding to the user identifier when there is the user record table corresponding to the user identifier determined by the user identifier identification module 120.

In one embodiment, a system is provided, which includes a shared apparatus and a measuring gauge. The shared apparatus are broadly defined and include any smart apparatus with a shared functionality, including but not limited to a television and the like. The embodiment of the present application is exemplified by a television, but those skilled in the art can understand that the method described in the present application can also be applied to other shared apparatus, such as a computer, a tablet, a server, and the like. The measuring gauge include, but are not limited to, at least one of a sphygmomanometer, a weight scale, a blood glucose meter, a heart throbmeter, a treadmill, a temperature meter, a squeeze dtbanineter, and an electronic sphygmograph, and the like. The shared apparatus can communicate with the measuring gauge, so that the measurement result outputted by the measuring gauge can be transmitted to the shared apparatus for storage in real time. The sharing apparatus is provided with a measuring gauge data storage apparatus, which is used to implement a method of storing data of a measuring gauge.

Figure 6:
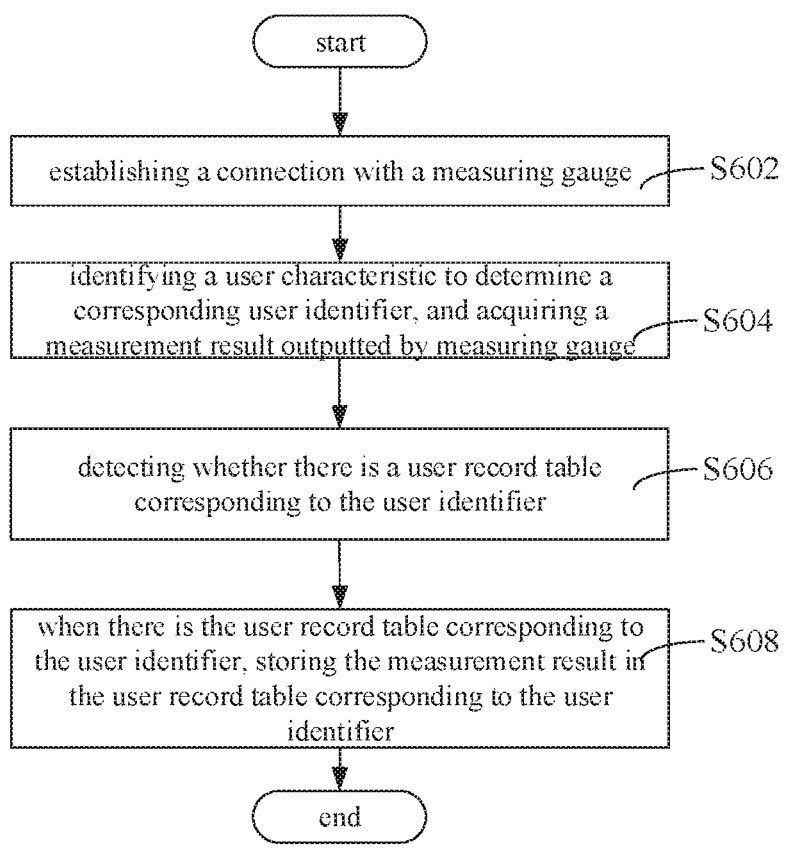
FIG. 6 is a flowchart illustrating a method of storing data of a measuring gauge according to one of the embodiments.

Referring to FIG. 6, it is a flowchart of a method of storing data of a measuring gauge according to one embodiment. In this embodiment, the method is applied to the aforementioned system which includes a measuring gauge and a shared apparatus as an example, and the method specifically includes the following steps.

In step S602, a connection with a measuring gauge is established.

In step S604, a user characteristic is identified to determine a corresponding user identifier, and a measurement result outputted by the measuring gauge is acquired.

In step S606, whether there is a user record table corresponding to the user identifier is detected.

In step S608, when there is the user record table corresponding to the user identifier, the measurement result is stored in the user record table corresponding to the user identifier.

In this embodiment, the connection with the measuring gauge is established, so that the measurement result outputted by the measuring gauge can be stored in real time. The corresponding user identifier is determined by identifying the user characteristic to determine the corresponding user record table. The measurement result can be accurately stored in the corresponding user record table, which avoids the measurement result from being stored in a wrong user record table, such as avoiding the measurement result of a user A from being stored in the user record table of a user B, therefore making the storage of the data of the measuring gauge accurate and reliable. Since it is stored in the shared apparatus, the user can simultaneously view the measurement results of himself or others, for example, it is merely required to open the corresponding measurement result stored in the television, thereby facilitating the user's viewing and improving the human-computer interaction.

Specifically, the television establishes a connection with a measuring gauge, such as the television can establish a connection with a sphygmomanometer or a weight scale. An establishment of the connection can be that the television actively establishes a connection with the measuring gauge after the television is turned on, or the measuring gauge actively requests to establish a connection with the television. For example, the measuring gauge can actively request to establish a connection with the television after transmitting the measurement result to the television or before outputting the measurement result, which is not limited here.

In one embodiment, the television can establish a connection with the measuring gauge via Bluetooth or WIFI. In other embodiments, other connection manners can be used to establish a connection, for example, when the shared apparatus is a mobile phone or a tablet, the connection can be established via a 3G or 4G network.

Specifically, in one embodiment, the television can acquire the measurement result outputted by the measuring gauge at first, and then identify the user identifier to determine the user record table. For example, when a weight scale is used by a user, the weight scale outputs a measurement result to the television at first, then the television identifies the user identifier of the user who uses the weight scale, thereby directly storing the measurement result in the corresponding user record table after determining the user record table. In another embodiment, the television can also determine the user identifier to determine the user record table at first and then acquire the measurement result outputted by the measuring gauge. For example, when a treadmill is used by a user, the user identifier can be determined at first to determine the corresponding user record table, and then the measurement results outputted by the treadmill over a long period of time are recorded. The measurement result herein is not only an independent value, but also a measurement result including reference values such as exercise time, exercise intensity, and exercise speed. For another example, when a squeeze dtbanineter is used by a user, the user identifier is determined at first to determine the corresponding user record table, and then the squeeze dtbanineter outputs the measurement result for a period of time. The measurement result mentioned here can include the maximum grip strength, as well as a curve of each grip change and duration. In addition, the user can also select the content of the measurement result as needed to be stored, such as measurement time, measurement data, etc., and which is not limited here.

Generally, since an using scenario of the television is relatively changeless, for example, when used in a home, if a current user is a family member, a pre-stored user record table generally exists in the television, and the television detects whether there is a user record table corresponding to the user identifier by determining whether the user identifier determined by the television and the user identifier of the user record table pre-stored in the television are the same. The user identifier can be a face, a user's name, a user's fingerprint, or etc. For example, when the user identifier determined by the television is a face, it is required to detect whether the face is stored in the television, if so, the user record table corresponding to the face is considered as the user record table of the user who is using the measuring gauge. When the user identifier determined by the television is a user's name, it is required to detect whether the user's name is stored in the television, if so, the user record table corresponding to the user's name is considered as the user record table of the user who is using the measuring gauge.

Figure 7:
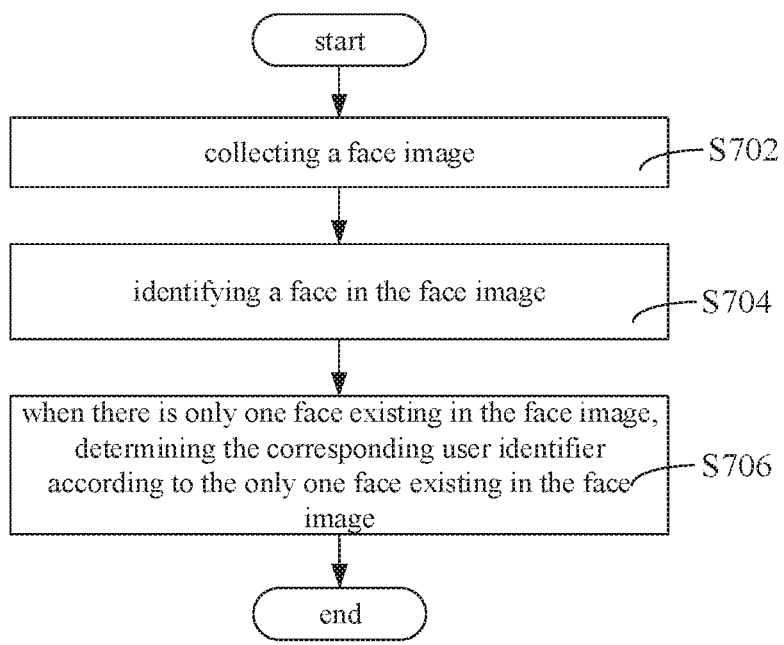
FIG. 7 is a flowchart of identifying a user characteristic to determine corresponding user identifer according to one of the embodiments.

In one of the embodiments, referring to FIG. 7, it is a flowchart of identifying the user characteristic to determine the corresponding user identifier. In this embodiment, the step of identifying a user characteristic to determine a corresponding user identifier includes following steps.

In step S702, a face image is collected.

In step S704, a face in the face image is identified.

In step S706, when there is only one face existing in the face image, the corresponding user identifier is determined according to the only one face existing in the face image.

In this embodiment, the user characteristic is a face, and the corresponding user identifier can be determined by identifying the face. Since each user's face has a difference, the corresponding user record table can be accurately determined. The measurement result of a user A would not be stored in the user record table of a user B. Therefore, the result is reliable.

In this embodiment, the face image can be collected by a dedicated camera provided on the television or provided on a remote controller of the television, or can be directly collected by a camera of a mobile phone connected to the television. The camera can capture images in a visible range thereof. For example, if there is only one user in the visible range of the camera, then there is only one face existing in the face image captured by the camera. The corresponding user identifier can be determined according to the only one face existing in the face image. Here, in order to simplify the operation, the face can be directly used as the user identifier.

Figure 8:
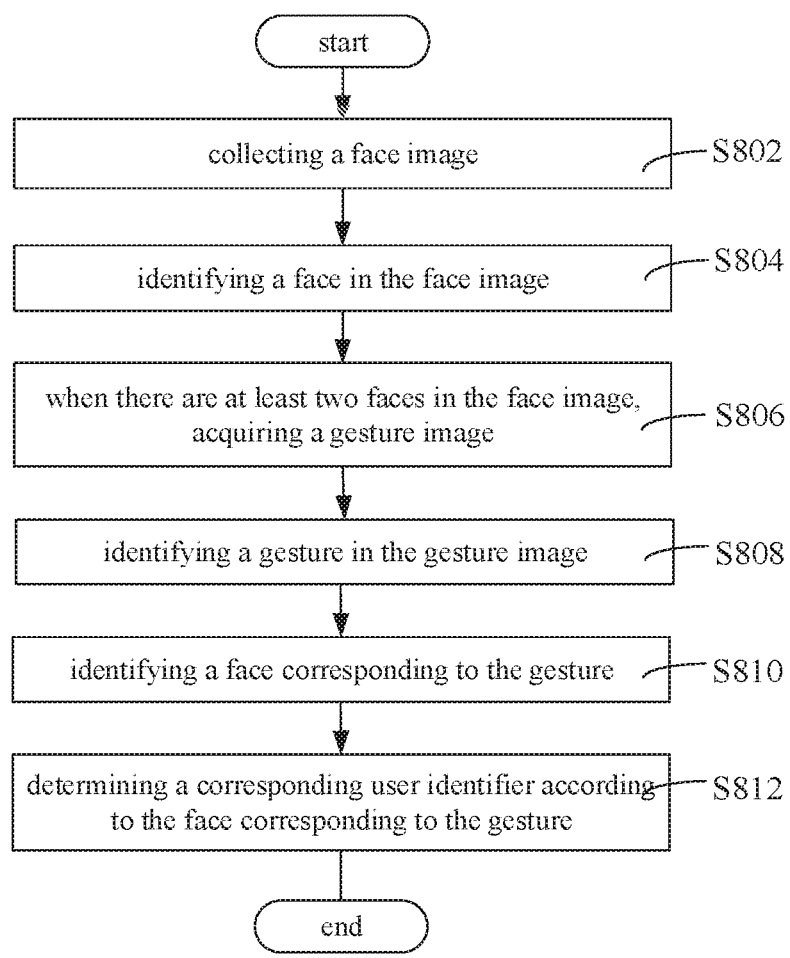
FIG. 8 is a flowchart of identifying a user characteristic to determine corresponding user identifer according to one of the embodiments.

In one of the embodiments, please refer to FIG. 8, it is a flowchart of identifying the user characteristic to determine the corresponding user identifier. Wherein, in this embodiment, the step of identifying the user characteristic to determine the corresponding user identifier includes following steps.

In step S802, a face image is collected.

In step S804, a face in the face image is identified.

In step S806, when there are at least two faces existing in the face image, the gesture image is acquired.

In step S808, a gesture in the gesture image is identified.

In step S810, a face corresponding to the gesture is identified.

In step S812, a corresponding user identifier is determined according to the face corresponding to the gesture.

In this embodiment, the face image can be collected by a dedicated camera provided on the television or provided on a remote controller of the television, or can be directly collected by a camera of a mobile phone connected to the television. The camera can capture images within a visible range thereof. In one embodiment, for example, currently, there are three users A, B, and C located within the visible range of the camera. When only the user A wants to transmit a measurement data to the shared apparatus, the camera collects the face image firstly. The television identifies the faces in the face image and judges that there are three faces in the collected face image. At this time, the camera needs to collect the gesture image, and the television identifies the gesture in the gesture image, that is, the gesture of the user A. After the television identifies the face corresponding to the gesture, the user identifier is determined according to the face corresponding to the gesture, that is, the face of the user A. Here, in order to simplify the operation, the face can be directly used as the user identifier. The process of collecting the face image and identifying the face of the camera can be performed in the manner described above, and the details are not described herein again. In step S806, when there are at least two faces in the face image, the user can be prompted to input a gesture firstly, for example, by a voice prompt or a text prompt, and the voice prompt can be a voice broadcasting "please put a specific gesture", etc.; the text prompt can be a text of "Please place a specific gesture" displaying on the apparatus, etc. The specific gesture can refer to gestures such as raising a hand, opening a palm, or making a fist, or can be customized according to different scenes and user habits.

In this embodiment, firstly, when it is uncertain to determine the user identifier according to which face in the face image, the corresponding face can be determined by gesture identification, so that the corresponding identifier can be determined according to the corresponding face. This expands an application mode of multiple users and improves the human-computer interaction. Secondly, the user characteristic is a face, so the corresponding user record table can be accurately determined. The measurement result of a user A would not be stored in the user record table of a user B. Therefore, the result is reliable.

Figure 9:
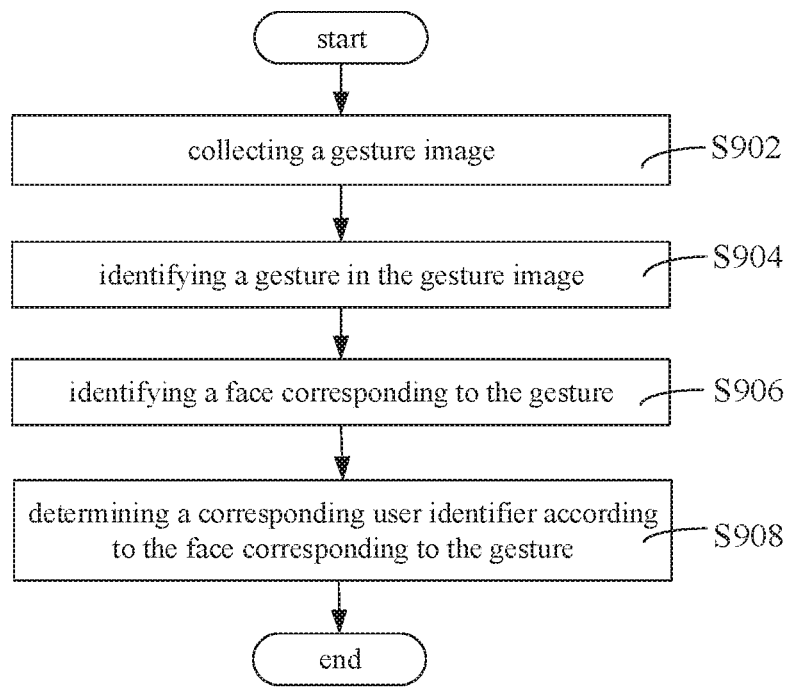
FIG. 9 is a flowchart of identifying a user characteristic to determine corresponding user identifer according to one of the embodiments.

In one of the embodiments, referring to FIG. 9, it is a flowchart of identifying the user characteristic to determine the corresponding user identifier. In this embodiment, the step of identifying the user characteristic to determine the corresponding user identifier includes following steps.

In step S902, a gesture image is collected.

In step S904, a gesture in the gesture image is identified.

In step S906, a face corresponding to the gesture is identified.

In step S908, a corresponding user identifier is determined according to the face corresponding to the gesture.

Figure 10:
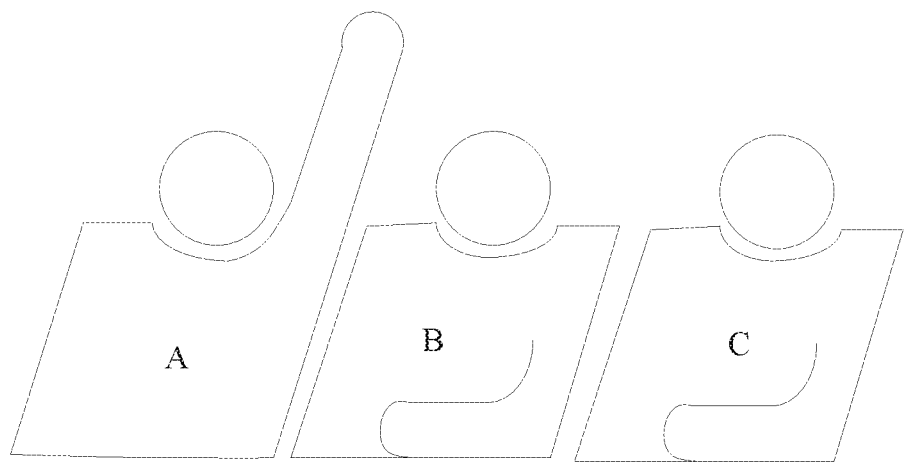
FIG. 10 is a schematic diagram of a collected image according to one of the embodiments.

In this embodiment, the face image can be collected by a dedicated camera provided on the television or provided on a remote controller of the television, or can be directly collected by a camera of a mobile phone connected to the television. The camera can capture images within a visible range thereof. In this embodiment, the location of a measured user is firstly determined by gesture identification, and the user identifier corresponding to the measured user is determined by face identification. In this embodiment, if the collected image contains both the face and the gesture, for example, as shown in FIG. 10, the television will preferentially identify the gesture. For example, if user A wants to store his measurement results in a television, the user A only needs to make a specific gesture within the visible range of the camera. When the camera captures the gesture image, the gesture image further includes the face of the user A. That is, the face of user the A, the face of user B, the face of user C, and the specific gesture of the user A can all exist in the visible range of the camera, then the camera will capture the image as shown in FIG. 10. After the television identifies the gesture of raising a hand of the user A, it will identify the face corresponding to the gesture of raising a hand of the user A, that is, the face of the user A, so that the face of the user A can be determined as the corresponding user identifier. Here, in order to simplify the operation, the face of A is directly used as a user identifier. The gesture of the user A can also be a fist or a palm.

In this embodiment, in order to simplify the process, the gesture image is directly collected, and the gesture of the user can be identified according to the gesture image to determine the corresponding user, and the corresponding user identifier can be determined according to the face of the corresponding user. In addition, the user characteristic is a face, so the corresponding user record table can be accurately determined. The measurement result of the user A would not be stored in the user record table of the user B. Therefore, the result is reliable.

Figure 11:
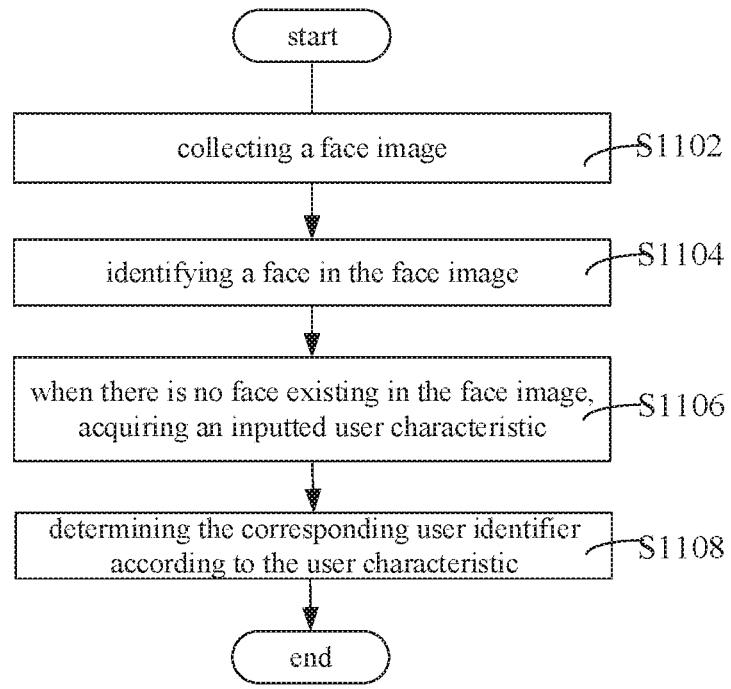
FIG. 11 is a flowchart of identifying a user characteristic to determine corresponding user identifer according to one of the embodiments.

In one of the embodiments, please refer to FIG. 11, it is a flowchart of identifying the user characteristic to determine the corresponding user identifier. In this embodiment, the step of identifying the user characteristic to determine the corresponding user identifier includes following steps.

In step S1102, a face image is collected.

In step S1104, a face in a face image is identified.

In step S1106, when there is no face in the face image, an inputted user characteristic is acquired.

In step S1108, a corresponding user identifier is determined according to the user characteristic.

In one embodiment, the step that the inputted user characteristic is acquired includes voice prompting or text prompting to input a user characteristic; and identifying the user characteristic inputted by the manner of voice or text. The voice prompt can be a voice broadcasting "please say the user name", etc., and the text prompt can be a text "please input the user name" displayed on the apparatus. In this embodiment, it can be divided into two specific implementation manners, one is to input the user characteristic by the manner of voice, for example, the user directly speaks out the user name and etc., and the other is to input the user characteristic by the manner of text, for example, the user inputs the user name by the manner of text. Moreover, the voice mode and the text mode described above can be performed by the remote controller of the television, the mobile phone connected to the television, or a display of the television. The user characteristic includes, but is not limited to, a user name, and can also include a user ID and the like. In one embodiment, the user characteristic can also include a user fingerprint or etc.

Generally, when there is no face in the face image, the user identifier cannot be determined by the face image. In this case, the user identifier is determined by directly acquiring the inputted user characteristic. It does not require complicated operations to determine the corresponding user identifier, which is convenient and reliable. In this embodiment, the corresponding user record table can be accurately determined according to the inputted user characteristic, so that the corresponding user record table can be accurately determined. The measurement result of the user A would not be stored in the user record table of the user B. Therefore, the result is reliable.

Figure 12:
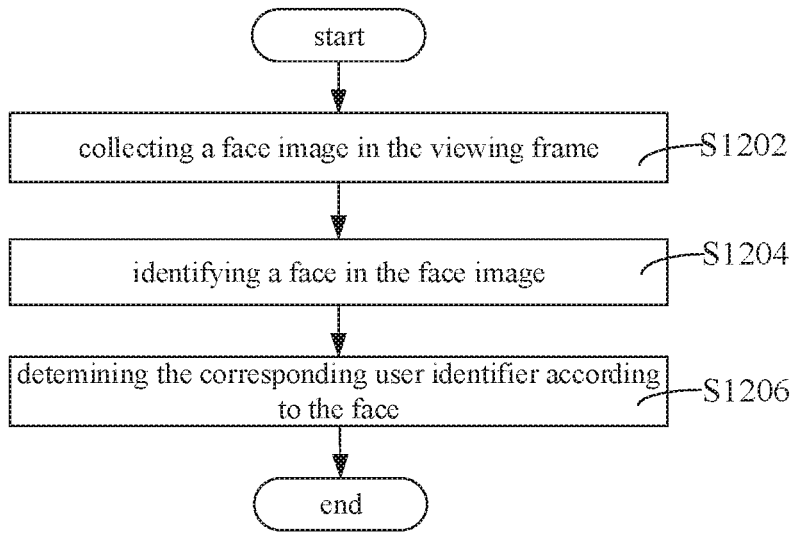
FIG. 12 is a flowchart of identifying a user characteristic to determine corresponding user identifer according to one of the embodiments.

In one of the embodiments, referring to FIG. 12, it is a flowchart of identifying the user characteristic to determine the corresponding user identifier. In this embodiment, the step of identifying the user characteristic to determine the corresponding user identifier includes following steps.

In step S1202, a face image in the viewing frame is collected.

In step S204, a face in the face image is identified.

In step S206, the corresponding user identifier is determined according to the face.

In this embodiment, the face image can be collected by a dedicated camera provided on the television or provided on a remote controller of the television, or can be directly collected by a camera of a mobile phone connected to the television. The camera can capture images within a visible range thereof. Specifically, when the television is required to acquire the user characteristic, the user characteristic can be collected by the camera. Since there may be multiple users' faces within the visible range of the camera, an unique user cannot be determined, so the viewing frame is introduced in the video picture of the camera, and the user who needs to store the measurement result to the television directly places his or her face in the viewing frame, thereby ensuring that there is only one face existing in the face image collected by the camera. Thus the user identifier is determined according to the face. Here, in order to simplify the operation, the face can be directly used as the user identifier.

This embodiment ensures that there is only one face existing in the collected face image, so that the user identifier can be accurately determined according to the unique face. In addition, the user characteristic is a face, so the corresponding user record table can be accurately determined. The measurement result of the user A would not be stored in the user record table of the user B. Therefore, the result is reliable.

The aforementioned cameras can adjust their own visible range to a range suitable for capturing a face image or a gesture image (for example, aiming at a face enlargement, etc.) as needed.

Figure 13:
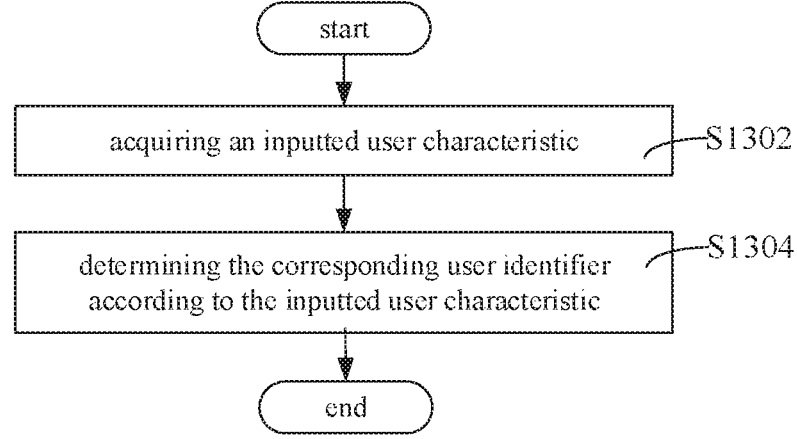
FIG. 13 is a flowchart of identifying a user characteristic to determine corresponding user identifer according to one of the embodiments.

In one of the embodiments, referring to FIG. 13, it is a flowchart of identifying the user characteristic to determine the corresponding user identifier in an embodiment. In this embodiment, the step of identifying the user characteristic to determine the corresponding user identifier includes following steps.

In step S1302, an inputted user characteristic is acquired.

In step S1304, the corresponding user identifier is determined according to the inputted user characteristic.

The step that the inputted user characteristic is acquired specifically includes: acquiring a user characteristic inputted by the manner of voice; or acquiring a user characteristic input by handwriting; or acquiring a user characteristic inputted by the manner of gesture. The afore mentioned user characteristic can be input via a remote controller, via a mobile phone, or via the television itself, that is, a touch display thereof. The user characteristic includes, but is not limited to, a user name, and can also include a user ID or a user gesture, etc. In one embodiment, the user characteristic can also include a user fingerprint or etc.

In this embodiment, the user identifier is determined directly according to the inputted user characteristic. This expands the determination manner of the user identifier, does not require complicated operations, and is convenient and reliable. In this embodiment, the corresponding user record table can be accurately determined according to the inputted user characteristic. The measurement result of the user A would not be stored in the user record table of the user B. Therefore, the result is reliable.

Figure 14:
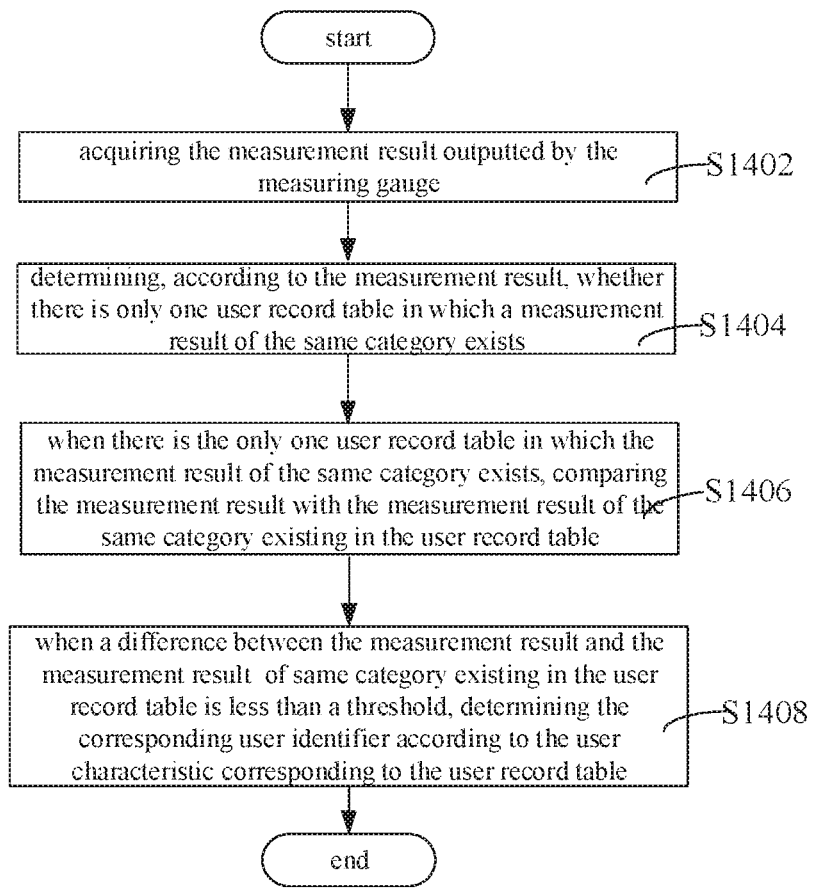
FIG. 14 is a flowchart of identifying a user characteristic to determine corresponding user identifer according to one of the embodiments.

In one of the embodiments, referring to FIG. 14, it is a flowchart of identifying the user characteristic to determine the corresponding user identifier. In this embodiment, the step S604 can include following steps.

In step S1402, the measurement result outputted by the measuring gauge is acquired.

In step S1404, whether there is only one user record table in which a measurement result of the same category exists is determined according to the measurement result.

In step S1406, when there is only one user record table in which the measurement result of the same category exists, the measurement result is compared with the measurement result of the same category existing in the user record table.

In step S1408, when a difference between the measurement result and the measurement result of the same category existing in the user record table is less than a threshold, the corresponding user identifier is determined according to the user characteristic corresponding to the user record table.

In this embodiment, the gauge measurement gauge is required to output the measurement result, and then the corresponding user identifier is determined to determine the corresponding user record table. When there is no measurement result of the same category existing in the user record table or when the difference between the measurement result and the measurement result of the same category existing in the user record table is greater than or equal to the threshold, the corresponding user identifier can be determined according to other embodiments described above, and the details are not described herein again. The measurement results of the same category refers to that the measurement result and the measurement result of the same category are both weight measurement results, both blood pressure measurement results or other categories, and a specific category can correspond to a corresponding measuring gauge, for example, a weight measurement result corresponds to a weight scale, a blood pressure measurement result corresponds to the blood pressure meter, and etc. The threshold described herein can be set according to different categories of measurement results. For example, when the category of the measurement result is weight, the threshold can be set to be 1 kg; when the category of the measurement result is body temperature, the threshold can be set to be 0.5 Celsius; when the measuring gauge is another category of apparatus, other threshold can be preset, and no specific limitation is imposed here.

In this embodiment, full-automatic control is implemented, that is, the user characteristic and the user characteristic table corresponding to the user characteristic can be determined in real time without user involvement. In this embodiment, the corresponding user record table can be accurately determined according to the measurement data outputted by the measuring gauge. The measurement result of the user A would not be stored in the user record table of the user B. Therefore, the result is reliable.

In one of the embodiment, after step S608, the method further includes registering a new user record table when there is no user record table corresponding to the user identifier; and storing the measurement result in the registered new user record table.

Generally, since an using scenario of the television is relatively changeless, for example, used in a home, if the current user is a family member, there will be a pre-stored user record table in the television, but if there is a guest visit, and it is first time of the guest to use the television to store measurement data, the cannot determine the user record table of the guest. In this case, the new user record table is required to be registered. For example, if the user identifier determined by the television is a face, and the face does not exist in the television, then the new user record table is registered, and the face is served as the user identifier corresponding to the new user record table, and the measurement result of the measuring gauge is stored in the new user record table. If the user identifier determined by the television is the user name and the user name does not exist in the television, then the new user record table is registered and the user name is served as the user identifier corresponding to the new user record table, and and the measurement result of the measuring gauge is stored in the new user record table.

While in this embodiment, when there is no corresponding user record table, a new user record table can be registered to store the corresponding measurement result, thereby effectively avoiding the wrong storage of the measurement result. This achieves a wide application range.

The technical characteristics of the foregoing embodiments can be combined arbitrarily. For the sake of brevity of description, all possible combinations of the technical characteristics in the above embodiments are not described. However, as long as there is no collision between the combinations of these technical characteristics, all combinations should be considered as the scope of this manual.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of storing data of a measuring gauge, comprising:
   establishing a connection with the measuring gauge;
   identifying a user characteristic to determine a corresponding user identifier and acquiring a measurement result outputted by the measuring gauge;
   detecting whether there is a user record table corresponding to the user identifier; and
   when there is the user record table corresponding to the user identifier, storing the measurement result in the user record table corresponding to the user identifier.

2. The method of claim 1, wherein the step of identifying the user characteristic to determine the corresponding user identifier comprises:
   collecting a face image;
   identifying a face in the face image; and
   when there is only one face existing in the face image, determining the corresponding user identifier according to the only one face existing in the face image.

3. The method of claim 2, wherein the step of identifying the user characteristic to determine the corresponding user identity further comprises:
   when there are at least two faces in the face image, collecting a gesture image;
   identifying a gesture in the gesture image;
   identifying a face corresponding to the gesture; and
   determining a corresponding user identifier according to the face corresponding to the gesture.

4. The method of claim 3, wherein the step of identifying the user characteristic to determine the corresponding user identity further comprises:
   when there is no face existing in the face image, acquiring an inputted user characteristic; and
   determining the corresponding user identifier according to the user characteristic.

5. The method of claim 4, wherein the step of acquiring the inputted user characteristic comprises:
   inputting the user characteristic by voice prompting or text prompting; and
   identifying the inputted user characteristic inputted by the manner of voice or text.

6. The method of claim 1, wherein the step of identifying the user characteristic to determine the corresponding user identifier comprises:
   collecting a gesture image;
   identifying a gesture in the gesture image;
   identifying a face corresponding to the gesture; and
   determining the corresponding user identifier according to the face corresponding to the gesture.

7. The method of claim 1, wherein the step of identifying the user characteristic to determine the corresponding user identifier comprises:
   acquiring an inputted user characteristic; and
   determining the corresponding user identifier according to the inputted user characteristic.

8. The method of claim 7, wherein the step of acquiring the inputted user characteristic comprises:
   acquiring the user characteristic inputted by a manner of voice; or
   acquiring the user characteristic inputted by a manner of handwriting; or
   acquiring the user characteristic inputted by a manner of gesture.

9. The method of claim 1, further comprising:
   when there is no user record table corresponding to the user identifier, registering a new user record table; and
   storing the measurement result in the registered new user record table.

10. The method of claim 1, wherein the step of identifying the user characteristic to determine the corresponding user identifier and acquiring the measurement result outputted by the measuring gauge comprises:
    acquiring the measurement result outputted by the measuring gauge;
    determining, according to the measurement result, whether there is only one user record table in which a measurement result of the same category exists;
    when there is only one user record table in which the measurement result of the same category exists, comparing the measurement result with the measurement result of the same category existing in the user record table;
    when a difference between the measurement result and the measurement result of same category existing in the user record table is less than a threshold, determining the corresponding user identifier according to the user characteristic corresponding to the user record table.

11. An apparatus of storing data of a measuring gauge, comprising: a processor and a memory for storing program instructions executed by the processor;
    wherein the processor is configured to:
    establish a connection with the measuring gauge and acquire a measurement result outputted by the measuring gauge;
    identify a user characteristic to determine a corresponding user identifier; and
    detect whether there is a user record table corresponding to the user identifier, and when there is the user record table corresponding to the user identifier, store the measurement result in the user record table corresponding to the user identifier.

12. The apparatus of claim 11, wherein the processor is further configured to execute the stored program instructions to:
    collect a face image;
    identify a face in the face image, and determine the user identifier according to an only one face existing in the face image when there is the only one face existing in the face image.

13. The apparatus of claim 12, wherein the processor is further configured to execute the stored program instructions to:
    collect a gesture image when there are at least two faces existing in the face image;
    identify a gesture in the gesture image;
    determine the user identifier according to the face corresponding to the gesture after identifying the face corresponding to the gesture.

14. The apparatus of claim 12, wherein the processor is further configured to execute the stored program instructions to:
    determine the corresponding user identifier according to the inputted user characteristic after acquiring the inputted user identifier when there is no user characteristic existing in the face image.

15. The apparatus of claim 14, wherein the processor is further configured to execute the stored program instructions to:
    input the user characteristic by voice prompt or text prompt characteristic when there is no face existing in the face image;

identify the user characteristic inputted by a manner of voice, and determine the corresponding user identifier according to the inputted user characteristic; and/or identify a user characteristic inputted by the manner of text, and determine the corresponding user identifier according to the inputted user characteristic.

16. The apparatus of claim 11, wherein the processor is further configured to execute the stored program instructions to:

acquire a gesture image;

identify a gesture in the gesture image; and identify a face corresponding to the gesture, and determine the corresponding user identifier according to the face corresponding to the gesture.

17. The apparatus of claim 11, wherein the processor is further configured to execute the stored program instructions to:

determine the corresponding user identifier according to an inputted user characteristic after acquiring the inputted user identifier.

18. The apparatus of claim 17, wherein the processor is further configured to execute the stored program instructions to:

acquire the user characteristic inputted by the manner of voice, and determine the corresponding user identifier according to the inputted user characteristic; or acquire a user characteristic inputted by the manner of text, and determine the corresponding user identifier according to the inputted user characteristic; or acquire the user characteristic inputted by the manner of gesture, and determine the corresponding user identifier according to the inputted user characteristic.

19. The apparatus of claim 11, wherein the processor is further configured to execute the stored program instructions to:

detect whether there is a user record table corresponding to the user identifier;

register a new user record table when there is no user record table corresponding to the user identifier; and store the measurement result in the user record table corresponding to the user identifier when there is the user record table corresponding to the user identifier, and store the measurement result in the registered new user record table after registering the new user record table.

20. The apparatus of claim 11, wherein the processor is further configured to execute the stored program instructions to:

determine the user identifier according to the user characteristic corresponding to the user record table, when there is only one user record table in which a measurement result of the same category exists and a difference between the measurement result and the measurement result of the same category existing in the user record table is less than a threshold.

* * * * *